Feb. 13, 1940. R. D. FISHER ET AL 2,190,061
LOADING DEVICE
Filed Oct. 24, 1938  2 Sheets-Sheet 1
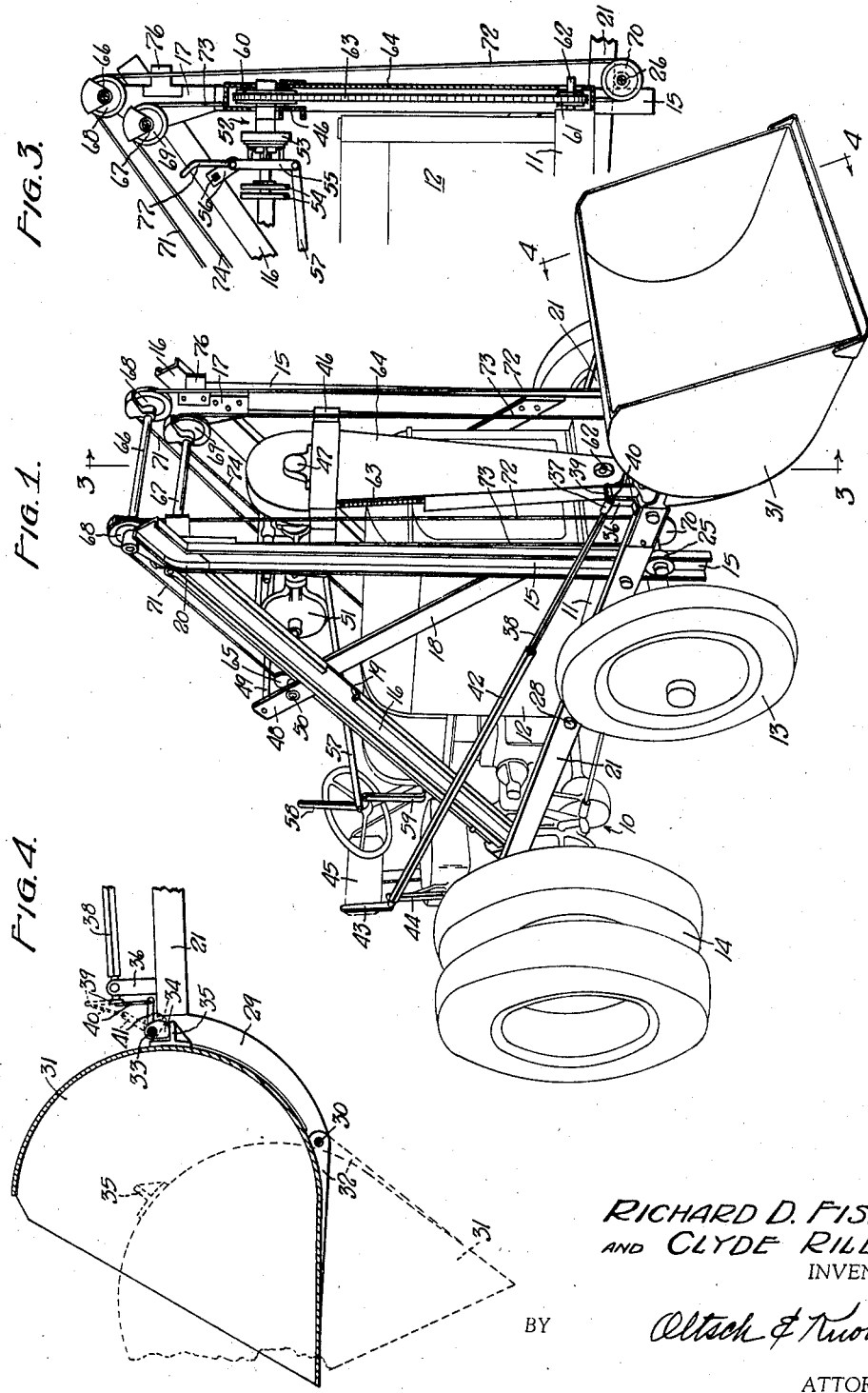
RICHARD D. FISHER.
AND CLYDE RILEY.
INVENTORS.
BY *Oltsch & Knoblock*
ATTORNEYS.

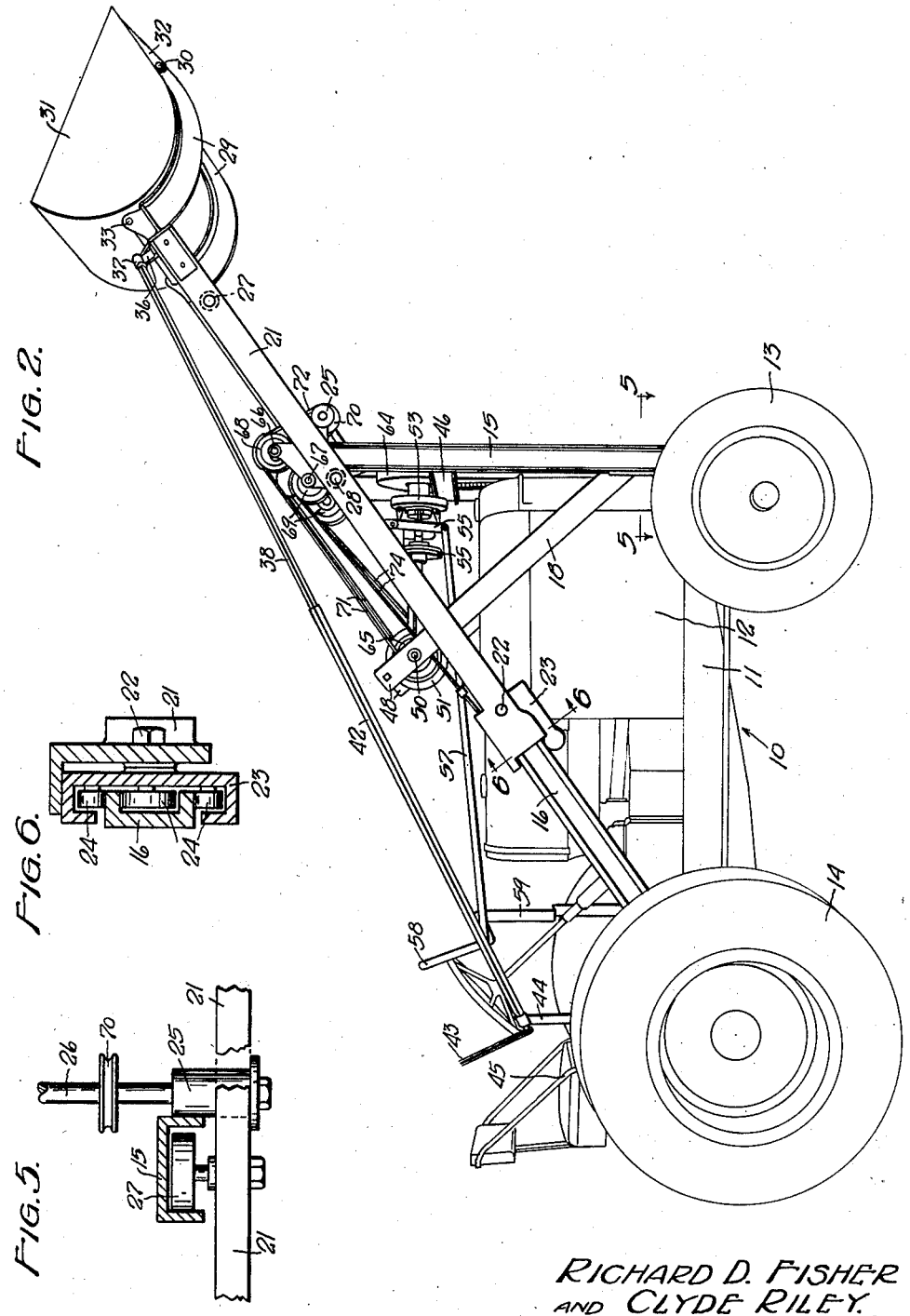

Patented Feb. 13, 1940

2,190,061

UNITED STATES PATENT OFFICE 2,190,061

LOADING DEVICE

Richard D. Fisher and Clyde Riley, Elkhart, Ind., assignors to White Manufacturing Company, Elkhart, Ind.

Application October 24, 1938, Serial No. 236,644

10 Claims. (Cl. 214—139)

This invention relates to improvements in loading devices, and particularly to a device of this character adapted for detachable mounting on a conventional tractor to be power driven by the tractor engine.

Previous devices of this character have had certain disadvantages and inadequacies. Chief among these was the pivotal mounting of the boom, so that, as the loading platform or shovel was swung upwardly, it also swung rearwardly to a position above the front of the tractor. This pivoted construction consequently limited the height to which the loading platform could be swung by the boom and still stay clear of the tractor. Another disadvantage of previous devices has been the necessity of operating the device from a power take-off behind the engine clutch on the tractor, which has resulted in lack of flexibility and maneuverability, or has required expensive auxiliary mechanism to obtain the desired flexibility and maneuverability. Still another disadvantage of previous constructions has been the necessity of employing extensive frame members which rendered the device cumbersome and heavy to apply to the tractor, and expensive.

It is the primary object of this invention to provide a device of this character having a boom which is extensible forwardly of the tractor when being raised to permit the loading platform or shovel to be positioned close to the front of the tractor when lowered and to be raised to a height of seven feet or more and at the same time spaced forwardly of the tractor for the purpose of loading large trucks, etc., having high bodies.

A further object is to provide a device of this character having a bodily shiftable boom, and means for guiding the same in predetermined manner.

A further object is to provide a device of this character constructed and arranged whereby its operating mechanism is driven from the crank shaft at the front of the tractor to be fully independent of tractor operation.

A further object is to provide a device of this character with novel shovel releasing and operating means.

A further object is to provide a device of this character whose shovel may be released at any selected raised position.

A further object is to provide a novel unit arrangement of clutch and brake coordinated for operative individual control by a single element.

A further object is to provide a device of this character so mounted and arranged on a tractor that general draw-bar use of the tractor is not interfered with.

In the drawings:

Fig. 1 is a front perspective view of the device with the boom lowered.

Fig. 2 is a side perspective view of the device with the boom elevated.

Fig. 3 is a fragmentary vertical sectional view taken on line 3—3 of Fig. 1 and illustrating the driving arrangement.

Fig. 4 is a sectional view of the shovel and its releasing mechanism taken on line 4—4 of Fig. 1, with the parts shown in released position in dotted lines.

Fig. 5 is a fragmentary horizontal sectional view taken on line 5—5 of Fig. 2.

Fig. 6 is a fragmentary sectional view taken on line 6—6 of Fig. 2.

Referring to the drawings, which illustrate the preferred embodiment of the invention, the numeral 10 designates a conventional tractor having a frame 11, engine 12, front wheels 13 and rear wheels 14.

A pair of upright channel members 15 are rigidly mounted on tractor frame 11 adjacent the front of the tractor at the opposite sides thereof; and a pair of forwardly upwardly inclined channel members 16 are fixedly secured to the upper ends of channels 15 by means of gusset plates 17 at their upper ends to hold the interconnected channels in coplanar relation. The rear lower ends of channels 16 are fixedly secured to the rear axle or the rear end of the frame of the tractor. Inclined braces 18 extend between channels 15, 16 to reinforce them. The flanges of both pair of channels 15, 16 are outwardly disposed. The lower flange of each channel 16 is interrupted at 19 intermediate its ends, for purposes to be hereinafter set forth. The upper ends of inclined channels 16 overlie and preferably project beyond the ends of channels 15, and the lower flanges of channels 16 are cut away to provide a passage between the interiors of said channels. Curved plates 20 project from the upper ends of the rear flanges of channel 15 and curve forwardly and upwardly therefrom to merge with upper flanges of channels 16.

A pair of elongated arms or booms 21, positioned on opposite sides of tractor frame 11, are pivoted at 22 to carriages 23 mounting rollers 24 which ride on inclined channels 16 to be guided by the channel flanges. The front end of each boom 21 bears on a roller 25 carried by a transverse shaft 26 which will be hereinafter more fully described. A roller 27 is journaled on each boom 21 adjacent the front end thereof, said roller being positioned between the webs of channel 15. Another roller is journaled at 28 on each boom 21 intermediate the ends of the boom. Curved brackets 29 are mounted on the front ends of booms 21 and carry transverse shafts 30 at their outer end. A suitable shovel 31, or a bucket, platform or like loading member mounts brackets 32 which are pivoted on shaft 30.

The ends of a shaft 33 are journaled in the rear upper ends of brackets 29, and a pair of cams 34 are fixedly mounted adjacent the ends of shaft 33. A pair of brackets, including projecting arms 35, are fixedly carried by the bucket juxtaposed to said cams whereby said cams may bear on the upper faces of arms 35 to lock the bucket in stationary relation to the booms. A bracket 36 projects upwardly from the free end of one boom 21 and pivotally mounts a journal 37 for one end of a rod 38. An arm 39 projects laterally from the end of rod 38 and is connected by means of a chain 40 with the end of an arm 41 projecting from cam shaft 33. Rod 38 is preferably of square or other non-circular cross-sectional shape and extends longitudinally rearwardly to fit within an elongated hollow member 42 of similar cross-sectional shape. Rod 38 is longitudinally slidable in member 42, but cannot rotate relative thereto. The rear end of member 42 carries a handle 43 and is journaled in a pivoted bearing on a support 44 suitably mounted on the tractor adjacent the operator's seat 45.

A transverse bar 46 rigidly interconnects the channels 15 intermediate their ends and mounts a bearing 47. A pair of arms 48 are rigidly carried by channels 16 and interconnected by cross bar 49. A transverse shaft 50 is journaled in arms 44 and mounts a conventional differential gear drive 51 with a longitudinally forwardly projecting drive shaft assembly 52 journaled in bearing 47. A conventional clutch 53 and a pair of relatively shiftable brake discs 54 are interposed in drive shaft assembly 52. A lever 55 pivoted to a cross bar assembly 56 is interposed between said clutch and brake and is connected thereto whereby pivoting thereof to brake-applying positions will disengage the clutch, and vice versa. Lever 55 is pivotally connected to one end of a link 57 whose opposite end is pivoted to a hand lever 58 pivoted on a bracket 59 adjacent the operator's seat 45.

A sprocket 60 is mounted on the forward end of shaft assembly 52, and a sprocket 61 is mounted on the crankshaft 62 of the tractor engine. A drive chain 63 runs over sprockets 60, 61. The sprockets and chain are enclosed by a guard 64 from whose lower end the crankshaft 62 preferably projects for convenient access for cranking the engine.

A sheave 65 is fixedly mounted on shaft 50 adjacent each end thereof, and each sheave mounts one end of a cable. A pair of cross shafts 66, 67 are journaled at their ends by bearings supported by gusset plates 17. Shaft 66 mounts a pulley 68 adjacent each end, and shaft 67 mounts a pulley 69 adjacent each end. A sheave 70 is journaled on each end of shaft 26 adjacent channels 15. The cables each extend in runs 71 from sheaves 65 to sheaves 68, thence in runs 72 to sheaves 70, thence in runs 73 to sheaves 69, and thence in runs 74 to carriages 23 to which they are fixedly connected.

The operation of the device is as follows: Assuming the bucket 31 is filled with the material to be loaded, and the tractor engine is operating; the hand lever 58 is shifted by the operator to engage clutch 53 through the medium of link 57 and lever 55. This effects an operative driving connection between the engine and shaft 50, and rotates sheaves 65 to pull upon one end of each of the two cables. The first action of the cables is to elevate shaft 26, and thereby elevate the front ends of booms 21. This movement of the boom is guided by rollers 27 within channels 15, and the rollers 25 on shaft 26 also run on and are guided by channels 15. As the boom is being elevated, the carriages 23 are slightly upwardly shifted on channels 16 by the cables, to accommodate the straight line vertical guided movement of the front end of the booms. During this movement the booms pivot relative to carriages 23 on pivots 22. When rollers 27 reach the upper ends of channels 15, they strike curved plates 20 and are guided into the channels 16; and at the same time, the intermediate rollers 28 enter the channels 16 at cut-outs 19. At this time, shaft 26 engages stops 76 in channels 15, and thereafter the pull of the cables is exerted directly upon carriages 23 to shift the booms longitudinally in guided parallel relation to channels 16. For this purpose, the upper ends of channels 16 project forwardly from channels 15 a sufficient distance to insure riding of intermediate rollers 28 into spaced relation to channel cut outs 19, so that when rollers 27 ride clear of the ends of channels 16, a two-point roller bearing for the booms is provided by rollers 28 and carriages 23. The longitudinal movement of the booms may continue until rollers 28 strike plates 20 to stop the boom in outermost extended and elevated position, wherein bucket 31 is substantially forwardly spaced from the tractor to facilitate loading of a truck. With the claimed construction, the bucket or shovel 31 may thus be positioned close to the front end of tractor 10 when lowered, as is obviously the most desirable position; and at the same time may be positioned at a sufficient height, i. e. seven to eight feet, and in a forwardly projected position relative to the tractor, to facilitate loading of any conventional truck or car. This is a distinct advantage over conventional loaders having pivoted booms, which require undesirable forward spacing of the bucket when lowered, and wherein movement of the bucket to elevate the same includes a rearward component of bucket movement incident to elevation thereof, so that one of two undesirable conditions results, i. e., either the boom must be made exceptionally long to provide proper bucket position forwardly of the tractor when elevated, or the height to which the bucket may be elevated is limited to an extent which permits use of the device to load only such trucks as have comparatively low bodies.

When the bucket 31 has been elevated to desired position hand lever 58 is operated to disengage clutch 53 and bring brake discs 54 into frictional gripping engagement to hold the driving mechanism stationary. Any position of the bucket may thus be maintained by the brake, there being nothing in the device to require any particular positioning of the bucket before the same can be stopped and held against movement. To return the bucket and booms to lowered position, hand lever 58 is operated to position lever 55 in an intermediate position between clutch operating and brake operating positions. This permits the bucket and boom to return to lowered position, guided by channels 15 and 16, by gravity.

To dump the bucket 31, hand lever 43 is operated to rotate telescoping shafts 38, 42, and thereby rotate cam shaft 33 through arm 39, chain 40, and arm 41, to disengage cams 34 from bracket 35. The pivot 30 of the bucket is so located in reference to the center of gravity of the bucket, that the bucket tilts by gravity upon release of cams 34 from brackets 35, and thus operates positively in all positions thereof. The telescoping sliding relation of shafts 38, 42, coupled with the pivot mounting of the ends thereof, permits the shaft assembly 38, 42 to maintain operative relation to the bucket at all times and at all elevated positions thereof. Also, the shaft assembly 38, 42, being operable independently of the remaining parts of the device, can be operated while the bucket is in any position within its entire range of movement. After the bucket has been released to dumping position, and then lowered, it reassumes operative relation to the boom when resting upon the ground, so that return of the shafts 38, 42 to normal position by lever 43, permits the cams 34 to reassume locking position by gravity. In this connection, as will be noted by referring to Fig. 4, the bulk of the cams 34 is normally positioned below shaft 33, and arm 41 projects laterally therefrom, so that releasing movement of both parts is upward as illustrated in dotted lines, with the result that said parts will reassume their operative positions by gravity when the upward pull of chain 40 is released.

It will be observed that the shaft 26 which mounts sheaves 70 and is shiftable vertically on channels 15 to raise the front ends of booms 21, constitutes means for maintaining the operating cables in taut operative relation to the device at all times.

The front power take-off of the device is of particular advantage in a device of this character, since it renders operation thereof completely independent of tractor operation. In other words, the tractor may be operated at any time without operating the device; and thus affords all flexibility and maneuverability to the unit required for any work for which the device is adapted. Illustrations of work wherein such flexibility are highly desirable and necessary are in backfilling, excavating, etc., where it is necessary to move the tractor after the bucket etc. has been loaded and elevated, and before it is dumped or discharged. Also, this front power take-off permits the tractor to be used for general draw-bar work as desired, without interference from the loading attachment. Heretofore, in devices of this character, it has been conventional to operate loaders from power take-offs rearwardly of the engine clutch of the tractor, and to rely upon operation of the conventional tractor clutch for control of the operation of the booms, etc., which obviously limits the use of both the tractor and the loading attachment. In the instant device, by extending the engine crank shaft 62 forwardly of the drive 61, 63, no interference with the operation of cranking the tractor engine is encountered by reason of the front position of said drive.

If desired, means may be incorporated for automatically controlling the clutch to limit the extent to which the boom may be shifted forwardly parallel to channels 16 at the end of its elevating operation. Thus, referring to Fig. 3, an arm 77 may project upwardly from lever 55, or may be keyed to the pivot shaft for said lever, to extend adjacent one of the channels 16 for engagement by a suitable projection not shown, carried by boom 21. The engagement of the projection with arm 77 will pivot lever 55 to clutch disengaging position to automatically limit forward movement of the boom. The operator would then pull the lever 55 the necessary amount to operatively engage brake discs 54 to hold the boom in this maximum extended position.

We claim:

1. A loading attachment adapted to be mounted on and operated by a tractor, comprising interconnected vertical and inclined guides adapted to be fixedly mounted on the tractor, a boom shiftably connected to said guides adjacent its ends and normally in substantially horizontal position adjacent the lower ends of said guides, and means for bodily elevating said boom along said guides to inclined position substantially parallel to said inclined guide and thence longitudinally moving said boom along said inclined guide.

2. A loading attachment adapted to be mounted on and operated by a tractor, comprising a rigid frame adapted to be fixedly connected to said tractor, said frame including an inclined guide and a vertical guide having an angularly extending portion at its upper end, a boom, spaced bearings carried by said boom and engaging said guides, and means for bodily shifting said boom relative to said guides to raise said boom to inclined position and thence longitudinally move said boom along said inclined guide and the angular upper end portion of the other guide.

3. A loading attachment as defined in claim 2, wherein said means includes an operating member slidably underlying the front of said boom and engaging said vertical guide.

4. A loading attachment as defined in claim 2, wherein said means comprises a cable secured to the rear end of said boom, a member slidably underlying the front of said boom and engaging said vertical guide, cable sheaves carried by said member and by the top of said frame, and means for pulling on said cable.

5. A loading attachment adapted to be mounted on and operated by a tractor, comprising a rigid frame adapted to be fixedly mounted on a tractor, said frame including an inclined guide and a vertical guide having an inclined upper portion aligned with said first guide, a boom, spaced bearings carried by said boom each normally engaging one of said guides, a bearing carried by said boom intermediate said first named bearings, said inclined guide having an interruption intermediate its ends, and means for shifting said boom into parallel relation to said inclined guide whereby said intermediate bearing enters said guide at said interruption, said means being adapted to longitudinally shift said boom when parallel to said inclined guide.

6. A loading attachment comprising a rigid frame having an inclined guide and a vertical guide having an inclined upper end, a boom, a bearing at each end of said boom, each bearing normally engaging a guide, means for raising said boom into parallelism with said inclined guide and thence longitudinally shifting said boom, and means carried by an intermediate portion of said boom and engaging said inclined guide when said boom assumes a parallel relation thereto for holding said boom in inclined position when longitudinally shifted to disengage the front bearing from its guide.

7. A loading attachment comprising a vertical channel, an inclined channel secured to the upper end of said vertical channel in spaced relation below its upper end, said channels intercommunicating at their juncture, a guide flange extending across said inclined channel at said juncture, a carriage shiftable in said inclined channel, a boom pivoted at one end to said carriage, a bearing carried by said boom and shiftable in said vertical channel, and means for shifting said boom to parallel relation to said inclined channel and thence longitudinally shift said boom, said guide flange guiding said bearing between said vertical channel and the upper end of said inclined channel.

8. A loading attachment as defined in claim 7, wherein said inclined channel has an opening spaced below said juncture, and said boom carries a bearing adapted to enter said channel at said opening, said last named bearing being engageable with said guide flange to limit the longitudinal shifting of said boom when elevated.

9. A loading attachment carried by a tractor comprising a bodily shiftable boom, a loading element pivoted eccentrically on said boom, a shaft journaled on said boom and carrying a cam, a projection on said element engageable by said cam, a rotatable telescoping shaft assembly whose parts are restrained against relative rotation, means pivotally mounting the opposite ends of said telescoping assembly on said tractor and boom, and means connecting said assembly and cam shaft to disengage said cam from said projection upon rotation of said telescoping assembly.

10. A loading attachment for a tractor having an engine, comprising a frame rigidly secured on said tractor and including a guide, a boom bodily shiftable relative to said frame and guide, of drive means for said boom including a clutch, clutch operating means including a part positioned adjacent said guide, and means on said boom engageable with said part to operate said clutch operating means for limiting the shifting of said boom in one direction.

RICHARD D. FISHER.
CLYDE RILEY.